May 3, 1960 A. J. W. M. VAN OVERBEEK ET AL 2,935,623

SEMICONDUCTOR SWITCHING DEVICE

Filed Dec. 7, 1954

INVENTORS
E. WILLEMS
A.J.W.M. VAN OVERBEEK
J.T.A. VAN LOTTUM
BY Fred M. Vogel
AGENT

United States Patent Office 2,935,623

Patented May 3, 1960

2,935,623

SEMICONDUCTOR SWITCHING DEVICE

Adrianus Johannes Wilhelmus Marie van Overbeek, Ebertus Willems, and Johannes Theodorus Antonius van Lottum, Eindhoven, Netherlands, assignors, by mesne assignments, to North American Philips Company, Inc., New York, N.Y., a corporation of Delaware Application December 7, 1954, Serial No. 473,624

5 Claims. (Cl. 307—88.5)

The present invention relates to semi-conductor switching devices. The principal object of the invention is to provide a circuit including an impedance which, under the action of a switching quantity, changes from a comparatively low to a comparatively high value.

A circuit arrangement according to the invention comprises an electric line and a transistor having an emitter electrode, a collector electrode and a base region; means are provided for connecting the emitter-collector path of the transistor in the line and means such as capacitors are also connected in the line for preventing direct current flow in the line. In the normal condition of the circuit, the emitter-collector path presents a comparatively high impedance in the line thereby substantially opening the line. Means are also provided for producing a current flow of predetermined magnitude in the base region of the transistor; upon the application of this current flow, the emitter-collector path presents a comparatively low impedance in the line, thereby substantially closing the line. More particularly, a switching quantity is supplied to the transistor; this may comprise a switching voltage applied to the base of a transistor triode or a switching luminous flux impinging on the base region of a phototransistor.

The invention will now be described more fully with reference to the accompanying drawing, in which.

Figures 1, 2, 3, 4, 5, 6, 7, 8, 9, 10:
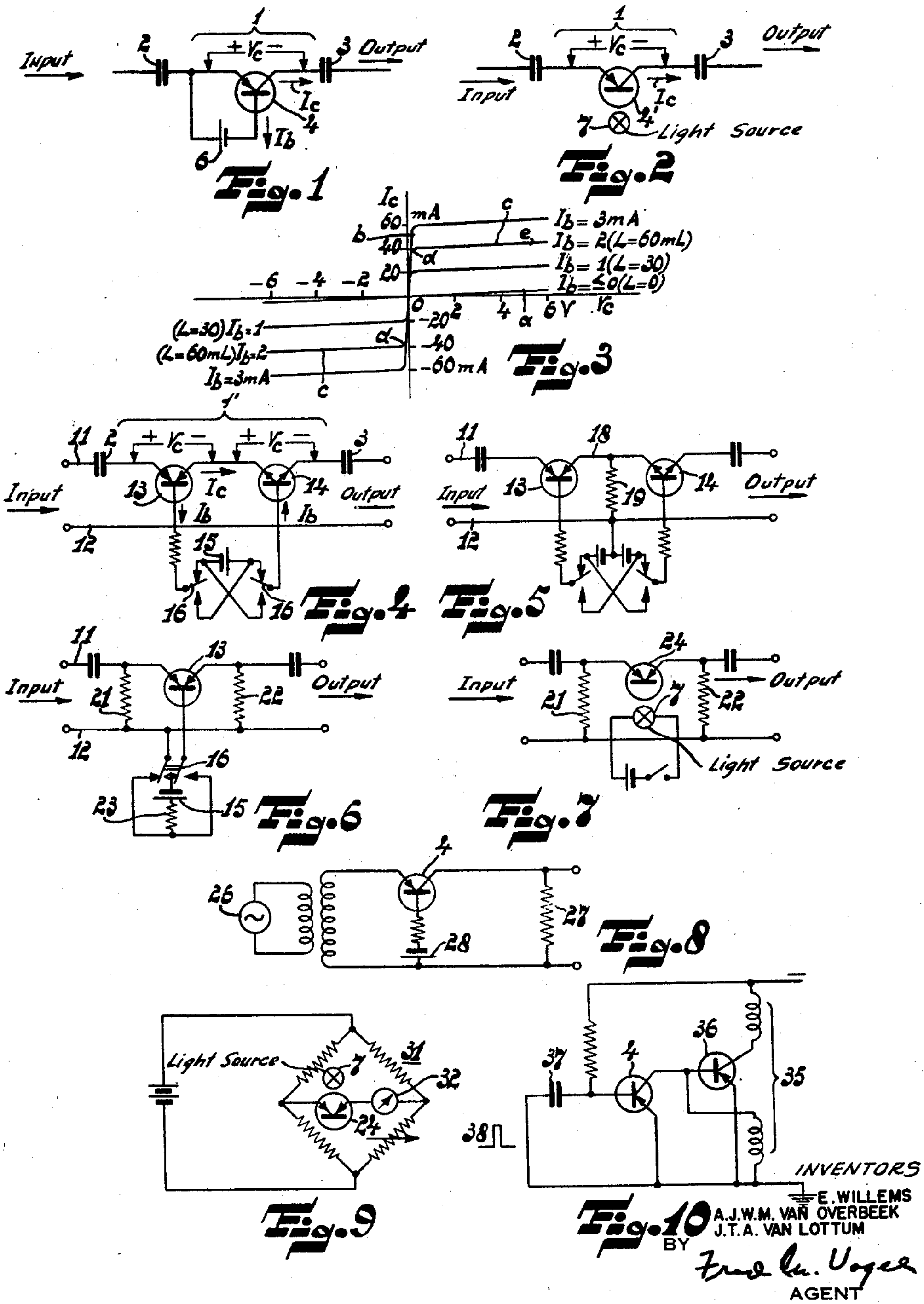
Fig. 1 is a schematic diagram of an embodiment of the circuit arrangement of the invention utilizing a transistor triode.
Fig. 2 is a schematic diagram of an embodiment of the circuit arrangement of the invention utilizing a phototransistor.
Fig. 3 is a series of current versus voltage characteristic curves for the circuit arrangements of Figs. 1 and 2.
Fig. 4 is a schematic diagram of an embodiment of the circuit arrangement of the invention for substantially short-circuiting or interrupting an electric line.
Fig. 5 is a schematic diagram of a modification of the embodiment of the circuit arrangement of Fig. 4.
Fig. 6 is a schematic diagram of another embodiment of the circuit arrangement of the invention.
Fig. 7 is a schematic diagram of a modification of the embodiment of Fig. 6.
Fig. 8 is a schematic diagram of an embodiment of the circuit arrangement of the invention for limiting electric signals.
Fig. 9 is a schematic diagram of an embodiment of the circuit arrangement of the invention for safeguarding a measuring instrument.
Fig. 10 is a schematic diagram of an embodiment of the circuit arrangement of the invention for stabilizing the operative or non-operative condition of an oscillator.

Figs. 1 and 2 are circuit arrangements in accordance with the invention, which consist of an electric circuit 1 in which, due to the provision of blocking capacitors 2 and 3, neither direct voltage is operative, nor direct current flows and which includes the emitter-collector path of a junction transistor 4 or 4', respectively. In Fig. 1 the transistor 4 is of the triode type and in its base circuit a current source 6 is connected for generating a base current $I_b$. In Fig. 2 the transistor 4' is a photo-transistor in which by means of a light source 7 free carriers are produced.

Fig. 3 is a curve family of a junction transistor which is known per se and in which the collector direct current $I_c$ is plotted as a function of the collector direct voltage $V_c$ at different values of the base current $I_b$; the currents and voltages concerned are positive if they correspond to the direction of the arrows or to the signs + — respectively in Fig. 1. These curves relate more particularly to transistors of the symmetrical kind which, as is well known, exhibit substantially identical charactertistics when the emitter and the collector are interchanged. Entirely analogous characteristic curves are found for the $I_c$—$V_c$ curves of a symmetrical phototransistor at different values of the incident luminous flux L, as is indicated in brackets in Fig. 3; the designation is the same as in the case of Fig. 2.

The circuits of Figs. 1 and 2 behave as a variable resistance. Since in accordance with the invention the direct voltage $V_c$ between the emitter and the collector is equal to zero, the operating point of the transistors 4 and 4' respectively is coincident with the origin O of the co-ordinates shown in Fig. 3. At this adjustment they present a comparatively high resistance of, for example, from a few hundred kilohms to a few megohms, if $I_b=0$ or $L=0$ respectively; this resistance corresponds to the slope of the curve *a* in Fig. 3. If $I_b$ or L respectively exceeds zero, a comparatively low resistance of, for example, less than 100 ohms is found, which resistance corresponds to the branch *b* in Fig. 3. Switching-over the current $I_b$ or the luminous flux L, respectively, consequently permits this resistance to vary from a comparatively high value to a comparatively low value and vice versa, so that the circuit is substantially interrupted or closed respectively.

On the other hand, a similar considerable resistance variation is found, if $I_b$ or L respectively are adjusted at a predetermined value, in which case the curve *c* may, for example, apply, and the signal current passing through the circuit 1 momentarily exceeds one of the bending points *d* of this curve. This resistance variation may in this case be used to limit the signal current.

Fig. 4 is an embodiment for substantially closing and interrupting an electric line. One line 11 of a two-wire electric line 11—12 comprises a circuit 1' which comprises the emitter-collector paths of a transistor 13 of pnp conductivity type; and of a transistor 14 of npn conductivity type between the bases of the transistors 13 and 14 a switching voltage source 15 is connected with a polarity which may be reversed by means of a commutator 16. Here also the blocking capacitors 2 and 3 connected in the line 11 prevent any direct current supplied from the source 15 from flowing off through said line.

In the position of the commutator 16 of Fig. 4, the source 15 tends to pass a negative base current $I_b$ so that the transistors 13 and 14 are adjusted at an operating line corresponding to the curve *a* shown in Fig. 3. Since in this case also, due to the provision of the capacitors 2 and 3, the mean collector voltage $V_c$ across each of the transistors 13 and 14 is equal to zero, the adjusting point of these transistors consequently again corresponds to the origin of the co-ordinates shown in Fig. 3. In this adjusting point the said operating line *a* presents a high differential resistance so that the line 11 may be regarded as substantially interrupted.

If the commutator 16 is reversed, the source 15 causes a positive base current $I_b$ to flow, with the result that the transistors 13 and 14 are adjusted at the operating line *b* which in the origin presents a very small differential resistance so that the line 11 may be regarded as substantially closed.

A further improvement is obtained if, as shown in the embodiment of Fig. 5, the line portion 18 between the two transistors 13 and 14 is connected to the line 12 through a resistance 19, which is small compared with the differential resistance of the branch *a* but large compared with that of the branch *b* in Fig. 3. The resistance 19 draws the greater part of the signal currents still passed, due to its comparatively small value, if the line 11 is desired to be interrupted, whereas, if the line 11 is desired to be closed, it will cause only a slight attenuation of the passed signal currents. If a point of the circuit between the two bases is desired to be connected to the line 12, which may be connected to ground, it will generally be preferable for this connection to be made at a point of symmetry of the circuit arrangement in order to insure a symmetrical operation of the transistors 13 and 14.

Fig. 6 is an alternative circuit arrangement for substantially short-circuiting or interrupting respectively an electric line, in which the line 11 includes only the emitter-collector-path of one signal transistor 13; in the base circuit of said transistor a switching voltage source 15 is operative with a polarity which may be reversed by means of a commutator 16. The circuit for the source 15 is closed through two resistances 21 and 22 connected to the line 12. The value of the resistances 21 and 22, similarly to that of the resistance 19 shown in Fig. 5, is again required to be small compared with the differential resistance of the curve *a* but large compared with that of the curve *b* in Fig. 3. A resistance 23 of sufficient value prevents the signal currents from being short-circuited.

Fig. 7 is a modification of the circuit arrangement of Fig. 6 comprising a photo-transistor 24 which may or may not be irradiated by the light source 7, and accordingly presents a comparatively small or comparatively large resistance, respectively. If desired, for a similar reason to that described with reference to Fig. 6, resistances 21 and 22 of the value indicated for Fig. 6 may be provided.

In the circuit arrangements of Figs. 4 to 7 the source 15 or the source 7 is generally required to supply such an amount of current or light respectively that the signal currents passing through the line 11 do not exceed the bending points (for example *d*) of the curves shown in Fig. 3, in order to avoid signal limitation. However, the required respective current intensity or luminous intensity is very slight, as may be seen from the numerical values given by way of example in Fig. 3.

Fig. 8 is a circuit arrangement for limiting electric signal oscillations. These oscillations are supplied from a signal source 26 through the emitter-collector path of a transistor 4 to an output impedance 27, which is again small compared with the differential resistance of the curve *a* but large as compared with that of the curve *b* shown in Fig. 3. A supply source 28 supplies a constant small base current to the transistor 4 with the result that curve *c*, for example, of Fig. 3 applies to the transistor 4.

So long as the signal currents passing through the transistor 4 are maintained smaller than corresponds to the bending points *d* of this curve, the transistor 4 presents a comparatively slight resistance which is equal to the differential resistance of the branch *b* in Fig. 3. However, as soon as these points are exceeded, this resistance becomes comparatively large. That is, the said resistance becomes equal to the differential resistance of the branch *e* in Fig. 3 which is approximately equal to that of the branch *a*. Consequently, across the impedance 27 are produced limited signal voltages, the maximum value of which approximately corresponds to the current value of the points *d* in Fig. 3. If in this case the transistor 4 is of the symmetrical type, a symmetrical limitation of the positive and the negative phases of the signal current is produced. On the other hand, in a transistor 4 of the unsymmetrical kind an unsymmetrical limitation is produced.

A similar limiting arrangement can be obtained by substituting a photo-transistor for the transistor 4 and a light source for the supply source 28. In this case the operation is entirely analogous to that of the arrangement of Fig. 8.

Fig. 9 is an arrangement for safeguarding a measuring instrument, more particularly a galvanometer 32 connected in the diagonal arm of a measuring bridge 31. If one of the impedances of the bridge 31 is required to be measured by varying one or more further known impedances of the bridge until the galvanometer 32 indicates zero, at the beginning of the measurement the bridge will generally be unbalanced so that a considerable current flows through the diagonal arm. This current is maintained within predetermined limits by connecting a photo-transistor 24, which is irradiated by an incandescent lamp 7, in series with the galvanometer 32; the effective resistance of said transistor in the substantially non-conductive condition is large compared with that of the galvanometer.

Fig. 10 is an oscillator arrangement the "on" and "off" conditions of which are stabilized. The oscillator consists of a transistor 36 provided with regenerative feedback by means of a transformer 35. The transistor 36 is prevented from spontaneous oscillation ("off" condition) by the provision of a damping resistance connected in parallel with the feed-back circuit. The said resistance consists of the emitter-collector path of a transistor 4, which is adjusted at a bias voltage corresponding to the pass direction of the emitter-collector path and consequently presents only a low resistance which is equal to the differential resistance of the branch *b* shown in Fig. 3. The base of the transistor 4 is connected to its emitter through a capacitor 37. If a pulse 38 is supplied to one of the circuits of the circuit arrangement, e.g. in series with the capacitor 37, or if the capacitor 37 is short circuited for a short period of time so that the transistor 4 is operated at its curve *a*, the damping in the feed-back circuit of the transistor oscillator 35—36 is so slight that the oscillator is enabled to oscillate spontaneously ("on" condition). The produced oscillator oscillations are detected in the collector-base blocking layer of the transistor 4. Thus the base of the transistor 4 has a potential applied to it which corresponds to the blocking direction of the emitter-base path, so that said transistor continues to operate at its curve *a*, and consequently continues to cause a substantially negligible damping of the oscillator 35—36.

In the circuit arrangement of Figure 10 a similar effect may also be obtained by substituting an RC filter for the capacitor 37 in the emitter circuit of the transistor 4. However, it is found that in this case satisfactory operation requires the use of a larger oscillator amplitude and the transistor 4 in the "on" condition of the oscillator 35—36 produces a heavier damping. The left hand terminal of the capacitor 37 may obviously also be connected to the negative terminal of the supply source so that it is connected to the emitter of the transistor 4 via the supply source.

What is claimed is:

1. A circuit arrangement comprising a pair of parallel electric lines, a pair of transistors each having an emitter electrode, a collector electrode and a base electrode, means for connecting the emitter-collector paths of said transistors in series in one of said lines, means connected in said one line for substantially preventing direct current flow in said emitter-collector paths, means for supplying a reverse bias voltage of predetermined magnitude to said base electrodes whereby the said emitter-collector paths present a comparatively high impedance in said one line thereby substantially opening said one line and for initiating a forward current flow of predetermined magnitude in said base electrodes whereby the said emitter-collector paths present a comparatively low impedance in said one line thereby substantially closing said one line, and a resistor connected between the other of said lines and a point on said one line in the series connection between said transistors, said resistor having a small resistance value compared to the said comparatively high impedance and a large resistance value compared to the said comparatively low impedance.

2. A circuit arrangement comprising a pair of parallel electric lines, a transistor having an emitter electrode, a collector electrode and a base region, means for connecting the emitter-collector path of said transistor in one of said lines, means connected in said one line for substantially preventing direct current flow in said emitter-collector path, means connected between said base region and the other of said lines for supplying a reverse bias voltage of predetermined magnitude to said base region whereby the said emitter-collector path presents a comparatively high impedance in said one line thereby substantially opening said one line and for initiating a forward current flow of predetermined magnitude in said base region whereby the said emitter-collector path presents a comparatively low impedance in said one line thereby substantially closing said one line, and circuit closing means comprising at least one resistor connected between said lines, said resistor having a small resistance value compared to the said comparatively high impedance and a large resistance value compared to the said comparatively low impedance.

3. A circuit arrangement as described in claim 2, wherein said circuit closing means comprises a first resistor connected between said emitter electrode and the other of said lines and a second resistor connected between said collector electrode and the other of said lines, said first and second resistors having small resistance values compared to the said comparatively high impedance and large resistance values compared to the said comparatively low impedance.

4. A circuit arrangement as described in claim 2, wherein said means for initiating a forward flow in said base region comprises a source of light positioned to supply impinging radiations to the said base electrode.

5. A circuit arrangement comprising an electric line, a pair of transistors each having an emitter electrode, a collector electrode and a base electrode, one of said transistors being of the PNP type and the other of the NPN type, means for connecting the emitter-collector paths of said transistors in series in said line, means connected in said line for substantially preventing direct current flow in said emitter-collector paths, bias means for supplying a reverse bias voltage of predetermined magnitude to said base electrodes whereby the said emitter-collector paths present a comparatively high impedance in said line thereby substantially opening said line and for initiating a forward current flow of predetermined magnitude in said base electrodes whereby the said emitter-collector paths present a comparatively low impedance in said line thereby substantially closing said line, a common circuit connecting said base electrodes, said bias means comprising a source of current supply and means for connecting said source in said common circuit in a desired polarity.

References Cited in the file of this patent

UNITED STATES PATENTS

| | | |
|---|---|---|
| 2,614,140 | Kreer | Oct. 14, 1952 |
| 2,622,213 | Harris | Dec. 16, 1952 |
| 2,676,271 | Baldwin | Apr. 20, 1954 |
| 2,693,568 | Chase | Nov. 2, 1954 |
| 2,763,832 | Shockley | Sept. 18, 1956 |
| 2,767,330 | Marshall | Oct. 16, 1956 |
| 2,802,065 | Sziklai | Aug. 6, 1957 |
| 2,812,437 | Sziklai | Nov. 5, 1957 |

OTHER REFERENCES

Sziklai: "Symmetrical properties of transistors and their applications," Proceedings of the I.R.E., June 1953.

Article: "Transistorized Moisture Detector," by Garner, pages 52, 53, 98 of Radio and Television News for September 1954.

Article: "A Versatile Transistor Circuit," by Cooke-Yorough, pages 567–568, of Proc. I.E.E. for October 1954, vol. 101, No. 83 (part II).